(12) United States Patent
Ryu et al.

(10) Patent No.: US 11,374,278 B2
(45) Date of Patent: Jun. 28, 2022

(54) BATTERY MODULE, BATTERY PACK INCLUDING BATTERY MODULE, AND VEHICLE INCLUDING BATTERY PACK

(71) Applicant: LG Chem, Ltd., Seoul (KR)

(72) Inventors: Jae-Uk Ryu, Daejeon (KR); Ji-Su Yoon, Daejeon (KR); Dal-Mo Kang, Daejeon (KR); Jeong-O Mun, Daejeon (KR)

(73) Assignee: LG Energy Solution, Ltd.

( * ) Notice: Subject to any disclaimer, the term of this patent is extended or adjusted under 35 U.S.C. 154(b) by 160 days.

(21) Appl. No.: 16/309,344

(22) PCT Filed: Mar. 9, 2018

(86) PCT No.: PCT/KR2018/002856
§ 371 (c)(1),
(2) Date: Dec. 12, 2018

(87) PCT Pub. No.: WO2018/174451
PCT Pub. Date: Sep. 27, 2018

(65) Prior Publication Data
US 2019/0319232 A1    Oct. 17, 2019

(30) Foreign Application Priority Data

Mar. 21, 2017  (KR) .................. 10-2017-0035399

(51) Int. Cl.
*H01M 50/20*         (2021.01)
*H01M 10/613*        (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC .. H01M 50/20; H01M 10/613; H01M 10/625; H01M 10/643; H01M 10/6569; H01M 50/502; H01M 2220/20
See application file for complete search history.

(56) References Cited

U.S. PATENT DOCUMENTS

2006/0073377 A1    4/2006  Al-Hallaj et al.
2009/0206096 A1    8/2009  Hirotsu et al.
(Continued)

FOREIGN PATENT DOCUMENTS

CN    103718341 A    4/2014
CN    105470441 A    4/2016
(Continued)

OTHER PUBLICATIONS

International Search Report for PCT/KR2018/002856, dated Jul. 2, 2018, 2 pages.
(Continued)

*Primary Examiner* — Stewart A Fraser
(74) *Attorney, Agent, or Firm* — Lerner, David, Littenberg, Krumholz & Mentlik, LLP

(57) ABSTRACT

Disclosed is a battery module, which includes: a plurality of battery cells stacked on one another; a cell housing configured to accommodate the plurality of battery cells; and a cover bus bar configured to cover an entire upper side of the cell housing and including electrode connection layers. The cover bus bar may be electrically connected to electrodes of the plurality of battery cells through the electrode connection layers. The electrode connection layers may be arranged in a layered structure.

14 Claims, 10 Drawing Sheets

(51) Int. Cl.
  *H01M 10/625* (2014.01)
  *H01M 10/643* (2014.01)
  *H01M 10/6569* (2014.01)
  *H01M 50/502* (2021.01)
(52) U.S. Cl.
  CPC ..... *H01M 10/643* (2015.04); *H01M 10/6569* (2015.04); *H01M 50/502* (2021.01); *H01M 2220/20* (2013.01)

(56) References Cited

U.S. PATENT DOCUMENTS

| | | | |
|---|---|---|---|
| 2013/0189563 A1 | 7/2013 | Chang et al. | |
| 2013/0202928 A1 | 8/2013 | Beulque et al. | |
| 2014/0234668 A1 | 8/2014 | Sweney et al. | |
| 2015/0079445 A1 | 3/2015 | Jeong et al. | |
| 2015/0325824 A1* | 11/2015 | Hasegawa | H01M 10/0525 429/53 |
| 2016/0093864 A1 | 3/2016 | Nakamura et al. | |
| 2016/0104925 A1* | 4/2016 | Xiang | H01M 10/613 429/82 |
| 2017/0005314 A1* | 1/2017 | Miyawaki | H01M 50/116 |
| 2017/0005380 A1 | 1/2017 | Harris | |
| 2017/0047572 A1* | 2/2017 | Biskup | H01M 50/502 |
| 2017/0077567 A1 | 3/2017 | Lim et al. | |
| 2017/0170439 A1* | 6/2017 | Jarvis | H01M 10/0525 |
| 2017/0288286 A1* | 10/2017 | Buckhout | H01M 2/1077 |
| 2018/0138478 A1* | 5/2018 | Chan | H01M 50/325 |
| 2019/0051955 A1 | 2/2019 | Lebreux et al. | |
| 2020/0052356 A1* | 2/2020 | Eadelson | H01M 10/613 |

FOREIGN PATENT DOCUMENTS

| | | |
|---|---|---|
| EP | 2950379 A1 | 12/2015 |
| JP | 2006324055 A | 11/2006 |
| JP | 2010211963 A | 9/2010 |
| JP | 2013062023 A | 4/2013 |
| JP | 2014525649 A | 9/2014 |
| JP | 2016-72039 A | 5/2016 |
| KR | 2002-0093827 A | 12/2002 |
| KR | 20140019961 A | 2/2014 |
| KR | 20140021830 A | 2/2014 |
| KR | 20140081949 A | 7/2014 |
| KR | 20150031092 A | 3/2015 |
| KR | 20150121039 A | 10/2015 |
| KR | 20160018982 A | 2/2016 |
| KR | 20160034675 A | 3/2016 |
| KR | 20160122444 A | 10/2016 |
| KR | 10-1679982 B1 | 11/2016 |
| WO | 2013022938 A2 | 2/2013 |
| WO | 2016120857 A1 | 8/2016 |
| WO | 2017004078 A1 | 1/2017 |

OTHER PUBLICATIONS

Supplementary Partial European Search Report for Application No. 18771924.0, dated Sep. 11, 2019, pp. 1-5.
Extended European Search Report including Written Opinion for EP18771924.0 dated Jun. 19, 2020; 11 pages.
Chinese Search Report for Application No. CN201880002855.4 dated Jan. 5, 2021.

* cited by examiner

BATTERY MODULE, BATTERY PACK INCLUDING BATTERY MODULE, AND VEHICLE INCLUDING BATTERY PACK

CROSS REFERENCE TO RELATED APPLICATIONS

The present application is a national phase entry under 35 U.S.C. § 371 of International Application No. PCT/KR2018/002856 filed Mar. 9, 2018, published in Korean, which claims priority from 10-2017-0035399 filed Mar. 21, 2017, in Korean, all of which are incorporated herein by reference.

TECHNICAL FIELD

The present disclosure relates to a battery module, a battery pack including the battery module, and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

Since a battery pack of a multi-module structure is manufactured so that a plurality of secondary batteries are densely packed in a narrow space, it is important to easily discharge heat generated from each secondary battery. Since the charging or discharging process of the secondary battery is performed by electrochemical reaction, if the heat of the battery module generated during charging and discharging is not effectively removed, heat accumulation may occur, resulting in deterioration of the battery module and causing ignition or explosion.

Thus, a high-capacity large-capacity battery module and a battery pack including the battery module should have a cooling device for cooling the battery cells included therein.

A conventional battery module uses a cooling structure in which a thermal interface material (TIM) is provided to contact between battery cells and a heatsink so as to dissipate heat.

However, due to low cooling performance of the conventional cooling structure, it is difficult to enhance the performance of a battery module and a battery pack, and also an electric vehicle having the battery module or the battery pack.

DISCLOSURE

Technical Problem

The present disclosure is directed to providing a battery module capable of maximizing the cooling performance, a battery pack including the battery module, and a vehicle including the battery pack.

Technical Solution

In one aspect of the present disclosure, there is provided a battery module, comprising: a plurality of battery cells stacked on one another; a cell housing configured to accommodate the plurality of battery cells; and a cover bus bar configured to cover an entire upper side of the cell housing and including electrode connection layers. The cover bus bar may be electrically connected to electrodes of the plurality of battery cells through the electrode connection layers. The electrode connection layers may be arranged in a layered structure.

The cover bus bar may further include insulation layers for insulating the electrode connection layers. The insulation layers and the electrode connection layers may be arranged in a layered structure.

The electrode connection layers may be disposed between the insulation layers, respectively.

The cover bus bar may include: a first insulation layer configured to form a lower side of the cover bus bar and provided to face the plurality of battery cells; a first electrode connection layer disposed at an upper side of the first insulation layer and electrically connected to one of positive electrodes or negative electrodes of the plurality of battery cells; a second insulation layer disposed at an upper side of the first electrode connection layer; a second electrode connection layer disposed at an upper side of the second insulation layer and electrically connected to the other of the positive electrodes or the negative electrodes of the plurality of battery cells; and a third insulation layer disposed at an upper side of the second electrode connection layer to form an upper side of the cover bus bar.

The first electrode connection layer and the second electrode connection layer may be provided as a flexible printed circuit board.

An insulation pattern may be provided to a rim of at least one of the first electrode connection layer or the second electrode connection layer.

A rim of the cover bus bar is bonded to a rim of the cell housing by seaming.

The battery module may further comprise a phase change material filled in the cell housing to guide cooling of the plurality of battery cells. The plurality of battery cells may be partially immersed in the phase change material.

The battery module may further comprise a heatsink mounted to at least one of the cell housing or the cover bus bar to cool the plurality of battery cells.

The phase change material may be a material that, when a temperature of the plurality of battery cells is raised, may evaporate and move toward the cover bus bar, and then may be liquefied by the heatsink and move to a lower side of the cell housing.

The battery module may further comprise a guide rib provided at an upper side of an inner wall of the cell housing to guide movement of the liquefied phase change material to a lower side of the cell housing.

The plurality of battery cells may be cylindrical secondary batteries.

In another aspect of the present disclosure, there is also provided a battery pack, comprising: at least one battery module according to the above embodiments; and a pack case configured to package the at least one battery module.

In another aspect of the present disclosure, there is also provided a vehicle, comprising at least one battery pack according to the above embodiments.

Advantageous Effects

According to various embodiments as above, it is possible to provide a battery module capable of maximizing the cooling performance, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
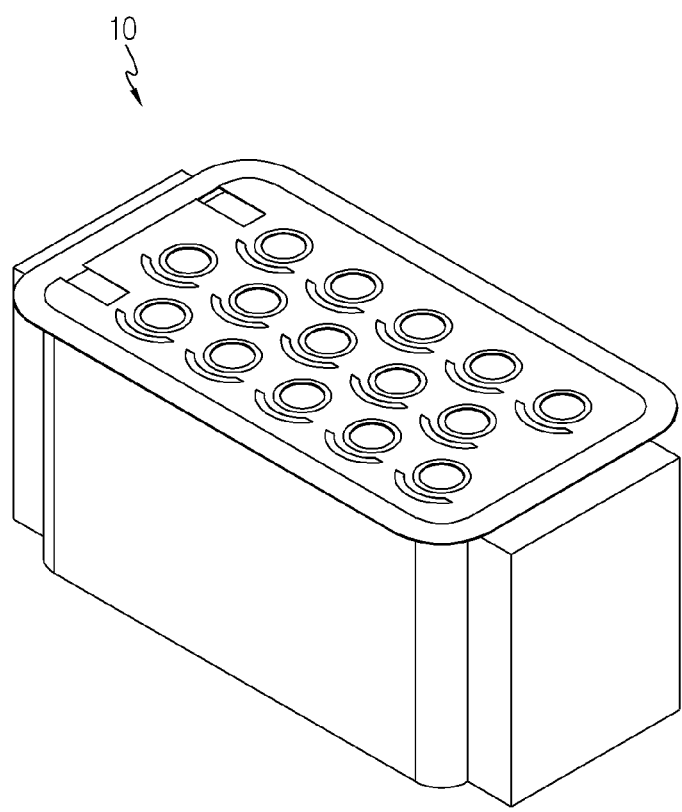
FIG. 1 is a diagram for illustrating a battery module according to an embodiment of the present disclosure.
Figure 2:
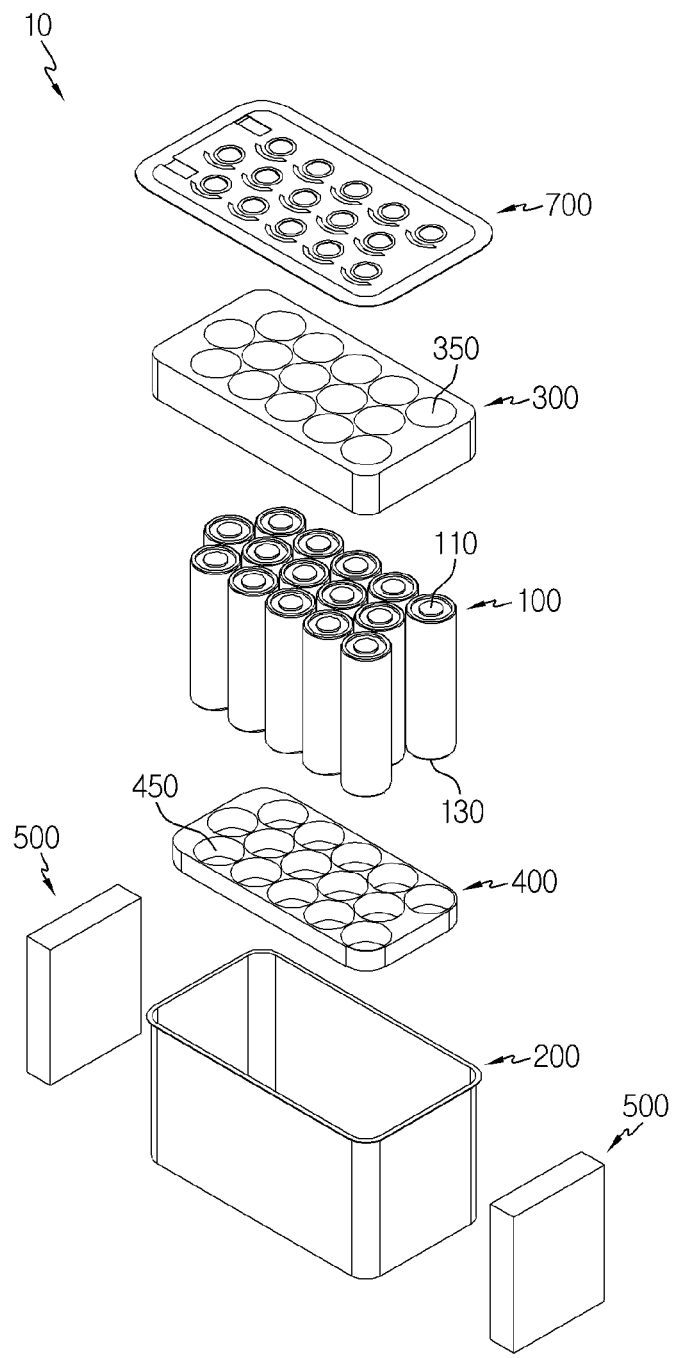
FIG. 2 is an exploded perspective view showing the battery module of FIG. 1.
Figure 3:
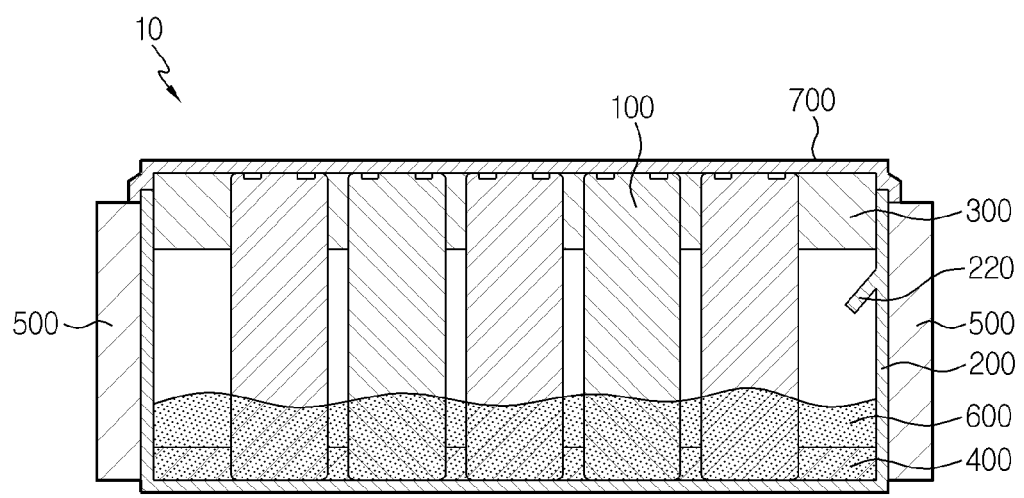
FIG. 3 is a cross-sectioned view showing the battery module of FIG. 1.

FIG. 1 is a diagram for illustrating a battery module according to an embodiment of the present disclosure, FIG. 2 is an exploded perspective view showing the battery module of FIG. 1, and FIG. 3 is a cross-sectioned view showing the battery module of FIG. 1.

Referring to FIGS. 1 to 3, a battery module 10 may include a battery cell 100, a cell housing 200, at least one cell fixing member 300, 400, a heatsink 500, a phase change material 600 and a cover bus bar 700.

The battery cell 100 may be provided in plural, and the plurality of battery cells 100 may be cylindrical secondary batteries. The plurality of battery cells 100 may be stacked on one another and electrically connected to each other.

A positive electrode 110 may be provided at an upper center of the plurality of battery cells 100, and a negative electrode 130 may be provided to an outer side, including a rim, and a bottom surface of the plurality of battery cells 100.

The cell housing 200 may accommodate the plurality of battery cells 100. For this, the cell housing 200 may have an accommodation space capable of accommodating the plurality of battery cells 100.

The guide rib 220 may be provided in the cell housing 200.

The guide rib 220 is provided at an upper side of an inner wall of the cell housing 200 and may guide the downward movement of a phase change material 600, explained later, when the phase change material 600 is liquefied (L). Specifically, the guide rib 220 may guide the liquefied (L) phase change material 600, explained later, to move faster toward a bottom plate 800, explained later.

At least one cell fixing member 300, 400 may fix the plurality of battery cells 100 to prevent the plurality of battery cells 100 from moving inside the cell housing 200.

The cell fixing member 300, 400 may be provided in a pair. The pair of cell fixing members 300, 400 may be composed of an upper cell fixing member 300 and a lower cell fixing member 400.

An upper portion of the plurality of battery cells 100 may be inserted into the upper cell fixing member 300, and the upper cell fixing member 300 may be fixed to an upper side of the inside of the cell housing 200. For this, the upper cell fixing member 300 may have a plurality of cell insert holes 350 into which the upper portion of the plurality of battery cells 100 is inserted.

A lower portion of the plurality of battery cells 100 is inserted into the lower cell fixing member 400, and the lower cell fixing member 400 may be fixed to a lower side of the inside of the cell housing 200. For this, the lower cell fixing member 400 may have a plurality of cell insert holes 450 into which the lower portion of the plurality of battery cells 100 is inserted.

The heatsink 500 is to cool the plurality of battery cells 100 and may be mounted to both side surfaces of the cell housing 200. Without being limited thereto, the heatsink 500 may also be mounted to an upper side of a cover bus bar 700, explained later. In other words, the heatsink 500 may be mounted to at least one of the cell housing 200 and the cover bus bar 700, explained later.

The phase change material 600 is to guide cooling of the plurality of battery cells 100 and may be partially filled in the cell housing 200. Accordingly, the plurality of battery cells 100 may be partially immersed in the phase change material 600 at the inside of the cell housing 200.

When a temperature of the plurality of battery cells 100 is raised, the phase change material 600 may be evaporated (V) and move to the cover bus bar 700, explained later, and then may be liquefied (L) by the heatsink 500 and move toward the bottom of the cell housing 200. The evaporation (V) and liquefaction (L) may be repeatedly circulated, and by doing so, the battery cells 100 may be cooled more effectively.

The phase change material 600 may be made of a fluorine-based material with a low melting point for more effective circulation. For example, the phase change material 600 may be made of a material with a low melting point of 35° C. to 50° C. Moreover, the phase change material 600 may contain a substance having a fire extinguishing function. Accordingly, when fire occurs in the battery module 10, the fire may be suppressed by the phase change material 600.

The cover bus bar 700 may cover an entire upper side of the cell housing 200. Here, the cover bus bar 700 may be coupled to the cell housing 200 through a seaming structure. This is to maximize the airtight structure of the cell housing 200 and to prevent the phase change material 600 in the cell housing 200 from being evaporated. The seaming structure may be formed between a rim of the cover bus bar 700 and an upper rim of the cell housing 200. In other words, the rim of the cover bus bar 700 may be bonded to the upper rim of the cell housing 200 by seaming.

The cover bus bar 700 may be electrically connected to electrodes 110, 130 of the plurality of battery cells 100 through electrode connection layers 710, 730 arranged in a layered structure, explained later.

In other words, in this embodiment, the cover bus bar 700 may function not only as a cover for the airtight structure of the cell housing 200 and but also as a bus bar for electrically connecting the electrodes 110, 130 of the battery cells 100.

Hereinafter, the electrical connection structure of the cover bus bar 700 will be described in more detail with reference to FIGS. 4 to 9.

Figure 4:
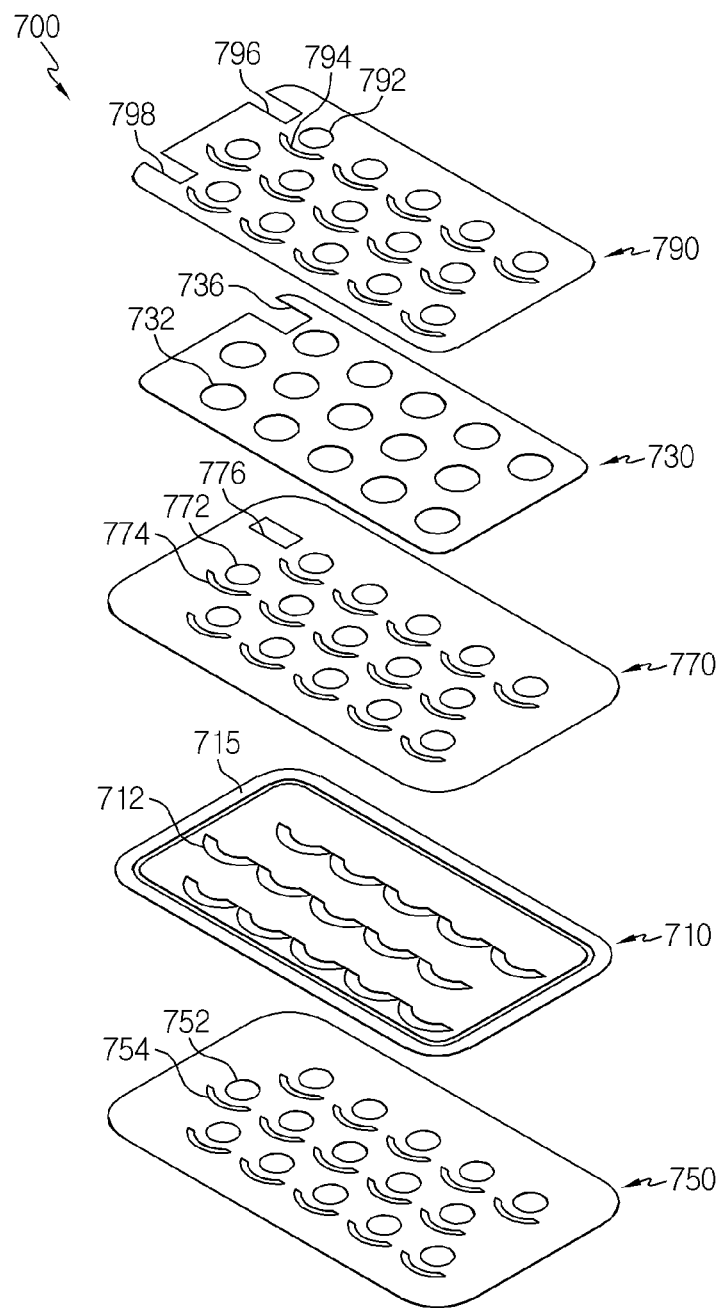
FIG. 4 is an exploded perspective view showing a cover bus bar employed at the battery module of FIG. 2.
Figure 5:
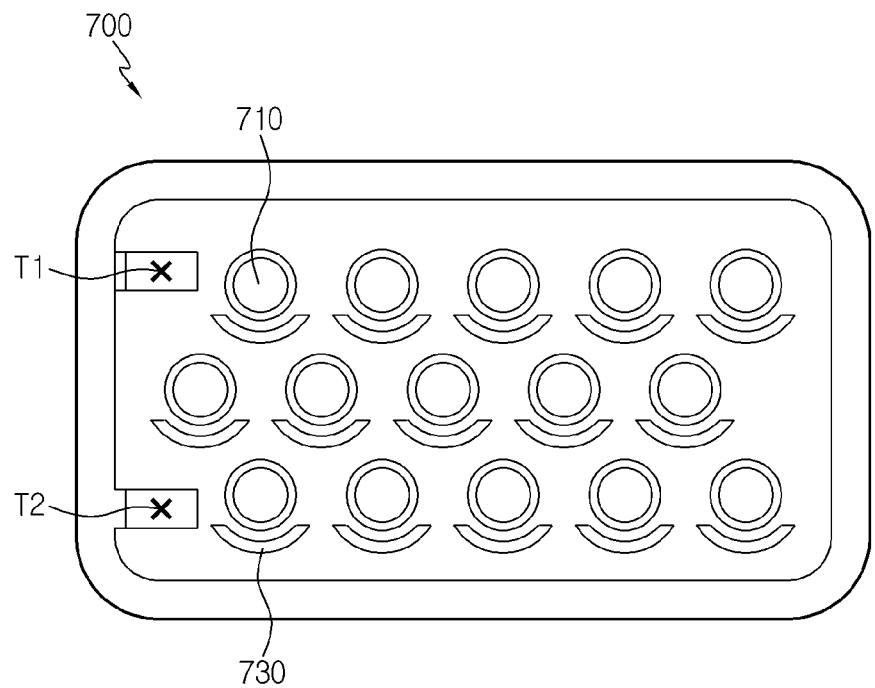
FIG. 5 is a plane view showing the cover bus bar of FIG. 4.

FIG. 4 is an exploded perspective view showing a cover bus bar employed at the battery module of FIG. 2, and FIG. 5 is a plane view showing the cover bus bar of FIG. 4.

Referring to FIGS. 4 and 5, the cover bus bar 700 may have a layered structure including the electrode connection layers 710, 730 and insulation layers 750, 770, 790 for insulating the electrode connection layers 710, 730.

The electrode connection layers 710, 730 are disposed between the insulation layers 750, 770, 790, respectively, and may include a first electrode connection layer 710 and a second electrode connection layer 730.

The first electrode connection layer 710 is disposed at an upper side of the first insulation layer 750, explained later, and may be electrically connected to one electrodes 110 of the positive electrodes 110 and the negative electrodes 130 of the plurality of battery cells 100. Hereinafter, in this embodiment, the first electrode connection layer 710 will be explained as being electrically connected to the positive electrodes 110 of the plurality of battery cells 100.

The first electrode connection layer 710 may be a flexible printed circuit board and may be electrically connected to the positive electrodes 110 of the plurality of battery cells 100 by welding.

Moreover, the first electrode connection layer 710 may be electrically connected to an external positive electrode high current terminal T1 for the connection to an external power source of the battery module 10 or the like. This electrical connection will be described in more detail with reference to FIGS. 6 and 7.

The first electrode connection layer 710 may have an electrode passing hole 712 and an insulation pattern 715.

The electrode passing hole 712 may be shaped corresponding to the negative electrodes 130 of the battery cells 100 to enable welding between the negative electrodes 130 (see FIG. 9) of the battery cells 100 and the second electrode connection layer 730.

Here, the electrode passing hole 712 may be formed larger than second electrode passing holes 754, 774, 794 of the insulation layer 750, 770, 790, explained later, in order to prevent the contact between the first electrode connection layer 710 and the second electrode connection layer 730 more securely.

The insulation pattern 715 is formed along a rim of the first electrode connection layer 710 and may insulate between an inner portion of the rim of the first electrode connection layer 710 and the cell housing 200 when the cell housing 200 and the cover bus bar 700 are bonded by seaming.

The second electrode connection layer 730 is disposed at an upper side of the second insulation layer 770, explained later, and may be electrically connected to the other electrodes 130 of the positive electrodes 110 and the negative electrodes 130 of the plurality of battery cells 100. Hereinafter, in this embodiment, the second electrode connection layer 730 will be explained as being electrically connected to the negative electrodes 130 of the plurality of battery cells 100.

The second electrode connection layer 730 may be a flexible printed circuit board, similar to the first electrode connection layer 710, and may be electrically connected to the negative electrodes 130 of the plurality of battery cells 100 by welding.

Moreover, the second electrode connection layer 730 may be electrically connected to an external negative electrode high current terminal T2 for the connection to an external power source of the battery module 10 or the like. This electrical connection will be described in more detail with reference to FIGS. 8 and 9.

The second electrode connection layer 730 may have an electrode passing hole 732 and a first terminal passing groove 736.

The electrode passing hole 732 may be shaped corresponding to the positive electrodes 110 of the battery cells 100 in order to enable welding between the positive electrodes 110 (see FIG. 7) of the battery cells 110 and the first electrode connection layer 710.

Here, the electrode passing hole 732 may be formed larger than first electrode passing holes 752, 772, 792 of the insulation layer 750, 770, 790, explained later, in order to prevent the contact between the first electrode connection layer 710 and the second electrode connection layer 730 more securely.

The first terminal passing groove 736 is to allow the external positive electrode high current terminal T1 to pass therethrough and may have a groove shape with a predetermined size. Here, the first terminal passing groove 736 may be formed larger than first terminal passing grooves 776, 796 of the second and third insulation layers 770, 790 in order to prevent the contact between the external positive electrode high current terminal T1 and the second electrode connection layer 730.

The insulation layers 750, 770, 790 may include a first insulation layer 750, a second insulation layer 770 and a third insulation layer 790.

The first insulation layer 750 forms a lower side of the cover bus bar 700 and may be disposed to face the upper side of the plurality of battery cells 100 when the cover bus bar 700 is coupled to the cell housing 200.

The first insulation layer 750 may have a first electrode passing hole 752 and a second electrode passing hole 754.

The first electrode passing hole 752 may be shaped corresponding to the positive electrodes 110 of the battery cells 100 to enable welding between the positive electrodes 110 (see FIG. 7) of the battery cells 100 and the first electrode connection layer 710.

The second electrode passing hole 754 may be shaped corresponding to the negative electrodes 130 of the battery cells 100 to enable welding between the negative electrodes 130 (see FIG. 9) of the battery cells 100 and the second electrode connection layer 730.

The second insulation layer 770 is disposed at an upper side of the first electrode connection layer 710 and may have a first electrode passing hole 772, a second electrode passing hole 774 and a first terminal passing groove 776.

The first electrode passing hole 772 may be shaped corresponding to the positive electrodes 110 of the battery cells 100 to enable welding between the positive electrodes 110 (see FIG. 7) of the battery cells 100 and the first electrode connection layer 710.

The second electrode passing hole 774 may be shaped corresponding to the negative electrodes 130 of the battery cells 100 to enable welding between the negative electrodes 130 (see FIG. 9) of the battery cells 100 and the second electrode connection layer 730.

The first terminal passing groove 776 is to allow the external positive electrode high current terminal T1 to pass therethrough for the connection between the external positive electrode high current terminal T1 and the first electrode connection layer 710, and may have a groove shape with a predetermined size.

The third insulation layer 790 is disposed at an upper side of the second electrode connection layer 730 and may form an upper side of the cover bus bar 700. The third insulation layer 790 may have a first electrode passing hole 792, a second electrode passing hole 794, a first terminal passing groove 796 and a second terminal passing groove 798.

The first electrode passing hole 792 may be shaped corresponding to the positive electrodes 110 of the battery cells 100 to enable welding between the positive electrodes 110 (see FIG. 7) of the battery cells 100 and the first electrode connection layer 710.

The second electrode passing hole 794 may be shaped corresponding to the negative electrodes 130 of the battery cells 100 to enable welding between the negative electrodes 130 (see FIG. 9) of the battery cells 100 and the second electrode connection layer 730.

The first terminal passing groove 796 is to allow the external positive electrode high current terminal T1 to pass therethrough for the connection between the external positive electrode high current terminal T1 and the first electrode connection layer 710, and may have a groove shape with a predetermined size.

The second terminal passing groove 798 is to allow the external negative electrode high current terminal T2 to pass therethrough for the connection between the external negative electrode high current terminal T2 and the second electrode connection layer 730, and may have a groove shape with a predetermined size.

Hereinafter, the connection between the cover bus bar 700 and the electrodes of the battery cells 100 will be described in more detail.

FIGS. 6 to 9 are diagrams for illustrating the electrode connection between the cover bus bar of FIG. 5 and the electrodes of the battery cells.

First, the connection of the cover bus bar 700 to the positive electrode 110 of the battery cells 100 and the external positive electrode high current terminal T1 will be described as below.

Figure 6:
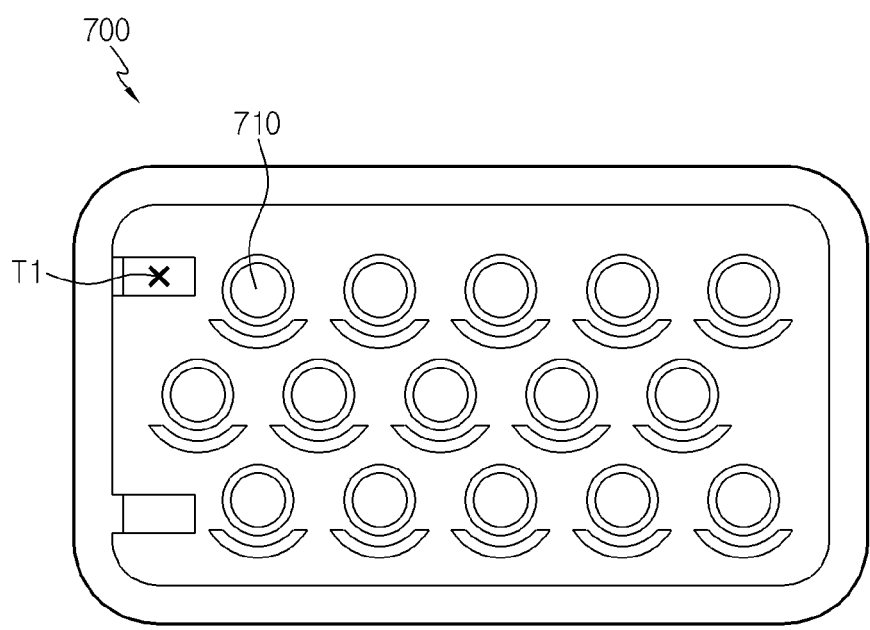
FIGS. 6 to 9 are diagrams for illustrating the electrode connection between the cover bus bar of FIG. 5 and electrodes of the battery cells.
Figure 7:
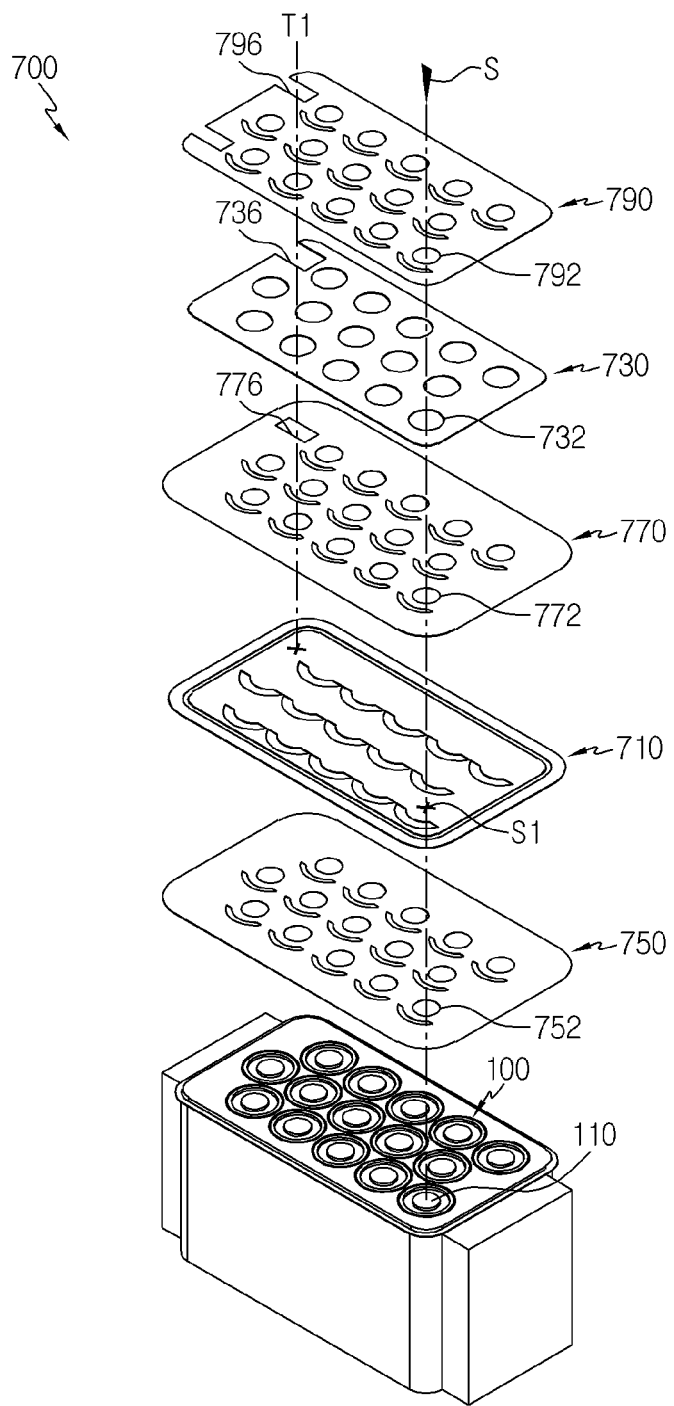

Referring to FIGS. 6 and 7, the first electrode connection layer 710 of the cover bus bar 700 may be connected to the positive electrodes 110 of the battery cells 100 by welding by means of a welding unit S. For example, the welding connection will be explained in more detail based on a single point S1 among welding connection portions of the first electrode connection layer 710.

The positive electrode 110 of the battery cell 100 may pass through the first electrode passing hole 752 of the first insulation layer 750 and come into contact with a bottom portion of the first electrode connection layer 710. In addition, the welding unit S provided at an upper side of the cover bus bar 700 may pass through the first electrode passing hole 792 of the third insulation layer 790, the electrode passing hole 732 of the second electrode connection layer 730 and the first electrode passing hole 772 of the second insulation layer 770 and then connect the first electrode connection layer 710 and the positive electrode 110 of the battery cell 100 by welding at the single point S1.

Next, seeing the connection between the first electrode connection layer 710 and the external positive electrode high current terminal T1, the external positive electrode high current terminal T1 may pass through the first terminal passing groove 796 of the third insulation layer 790, the first terminal passing groove 736 of the second electrode connection layer 730 and the first terminal passing groove 776 of the second insulation layer 770 and then be electrically connected to the first electrode connection layer 710.

In addition, the connection of the cover bus bar 700 to the negative electrode 130 of the battery cells 100 and the external negative electrode high current terminal T2 is as follows.

Figure 8:
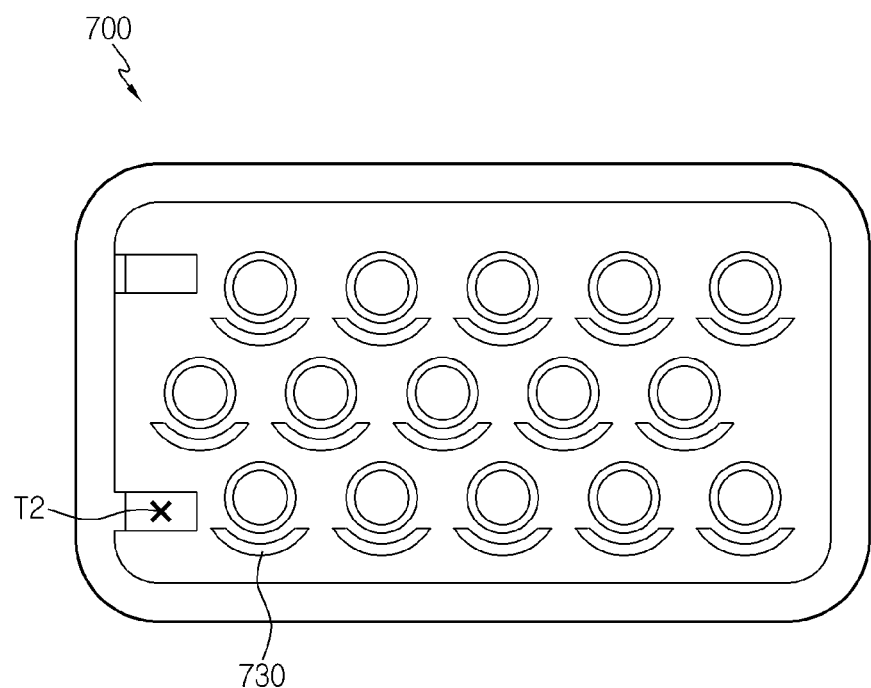
Figure 9:
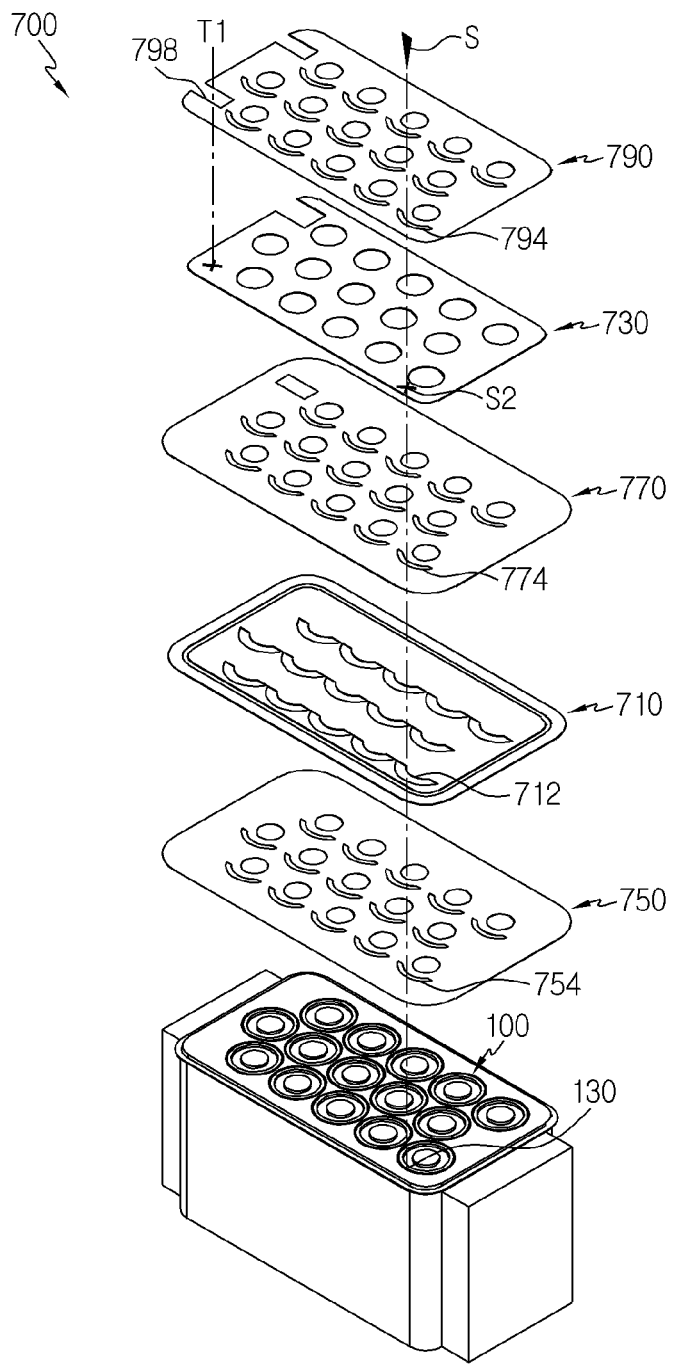

Referring to FIGS. 8 and 9, the second electrode connection layer 730 of the cover bus bar 700 may be connected to the negative electrodes 130 of the battery cells 100 by welding by means of the welding unit S. For example, the welding connection will be explained in more detail based on a single point S2 among welding connection portions of the second electrode connection layer 730.

The negative electrode 130 of the battery cell 100 may pass through the second electrode passing hole 754 of the first insulation layer 750, the electrode passing hole 712 of the first electrode connection layer 710 and the second electrode passing hole 774 of the second insulation layer 770 and come into contact with a bottom of the second electrode connection layer 730.

In addition, the welding unit S provided at an upper side of the cover bus bar 700 may pass through the second electrode passing hole 794 of the third insulation layer 790 and then connect the second electrode connection layer 730 and the negative electrode 130 of the battery cell 100 by welding at the single point S2.

Next, seeing the connection between the second electrode connection layer 730 and the external negative electrode high current terminal T2, the external negative electrode high current terminal T2 may pass through the second terminal passing groove 798 of the third insulation layer 790 and then be electrically connected to the second electrode connection layer 730.

As described above, in the battery module 10 of this embodiment, all terminal connections for the electrodes 110, 130 of the battery cells 100, external power sources and the like may be implemented by means of the first and second electrode connection layers 710, 730 of the cover bus bar 700 provided using the flexible printed circuit board with a layered structure.

Hereinafter, the cooling of the battery module 10 according to this embodiment will be described in more detail.

Figure 10:
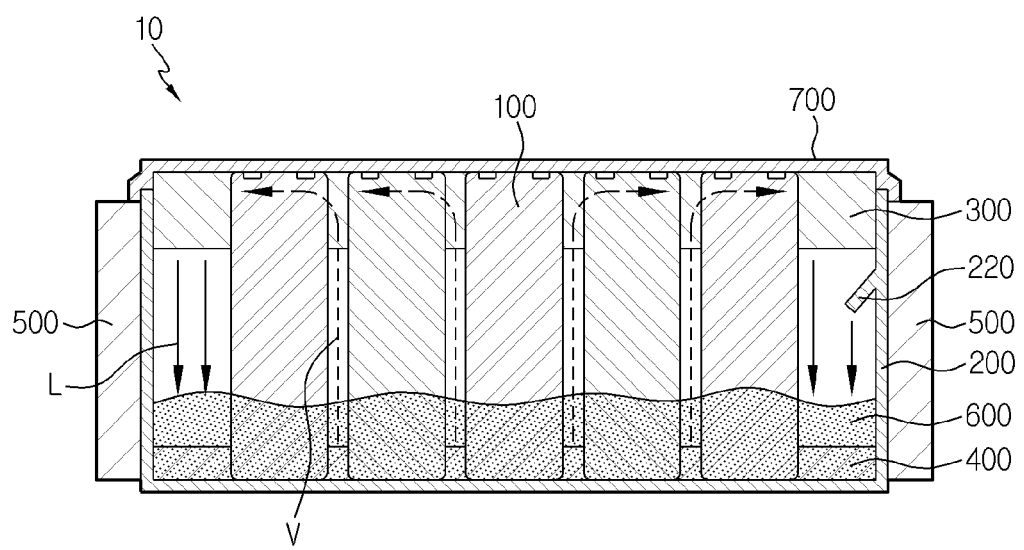
FIG. 10 is a diagram for illustrating the cooling principle of the battery module of FIG. 1.

FIG. 10 is a diagram for illustrating the cooling principle of the battery module of FIG. 1.

Referring to FIG. 10, in the battery module 10, if a temperature of the battery cells 100 is raised, the phase change material 600 is evaporated (V) and moves toward the cover bus bar 700 while lowering the temperature of the battery cells 100. After that, the phase change material 600 may be liquefied (L) by the heatsink 500 and move to a lower side of the cell housing 200 again.

As described above, the evaporation (V) and liquefaction (L) may be repeatedly circulated, and by doing so, the battery cells 100 may be cooled more effectively.

As described above, the battery module 10 of this embodiment may maximize the cooling performance of the battery module 10 by means of the phase change material 600.

Moreover, in the battery module 10 of this embodiment, since the cover bus bar 700 functions to seal the cell housing 200 and also serves as a bus bar for electrical connection of the battery cells 100, it is possible to lower the manufacture cost and improve the manufacture efficiency, compared to a conventional configuration having a bus bar structure and a cover structure.

In addition, in aspect of energy density, the battery module 10 of this embodiment may further secure the capacity of the battery cells 100 relatively as much as the volume of a structure excluded or reduced.

Figure 11:
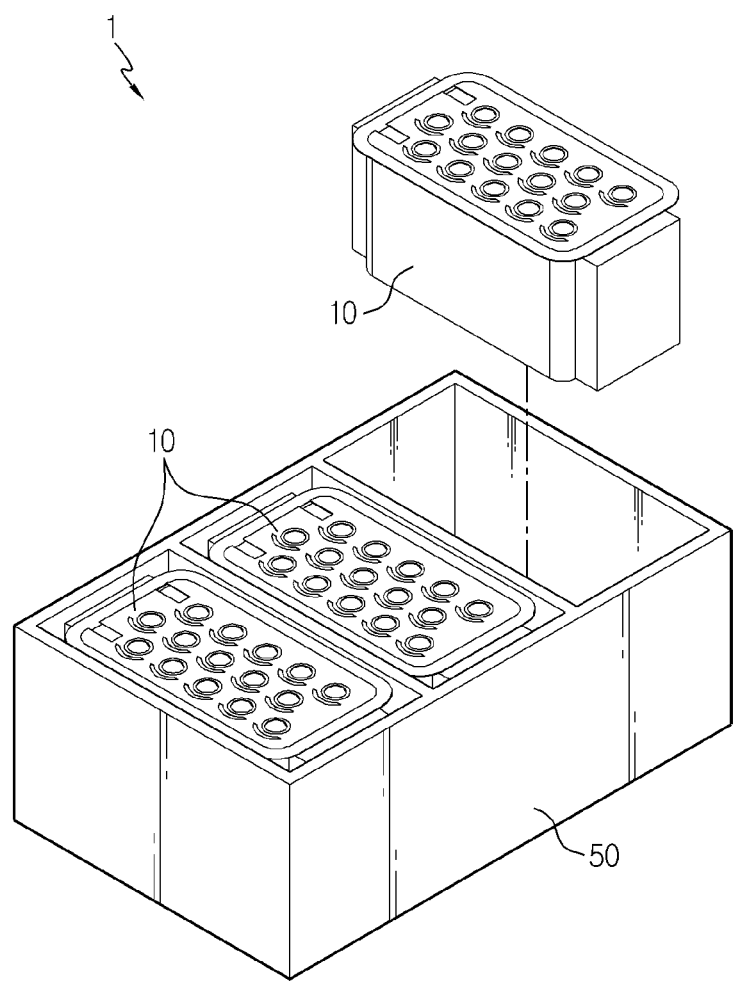
FIG. 11 is a diagram for illustrating a battery pack according to an embodiment of the present disclosure.

FIG. 11 is a diagram for illustrating a battery pack according to an embodiment of the present disclosure.

Referring to FIG. 11, a battery pack 1 may include at least one battery module 10 according to the former embodiment and a pack case 50 for packaging the at least one battery module 10.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a plurality of battery cells stacked on one another;
a cell housing configured to accommodate the plurality of battery cells;
a cover bus bar configured to cover an entire upper side of the cell housing and including electrode connection layers, wherein the cover bus bar is electrically connected to electrodes of the plurality of battery cells through the electrode connection layers, and wherein the electrode connection layers are arranged in a layered structure;
a phase change material filled in the cell housing to guide cooling of the plurality of battery cells, wherein the plurality of battery cells are partially immersed in the phase change material; and
a guide rib provided at an upper side of an inner side wall of the cell housing to guide movement of the phase change material to a lower side of the cell housing,
wherein the guide rib extends from the inner side wall of the cell housing and is angled diagonally toward the lower side of the cell housing from a location at which the guide rib is attached to the inner side wall of the cell housing.

2. The battery module according to claim 1,
wherein the cover bus bar further includes insulation layers for insulating the electrode connection layers, wherein the insulation layers and the electrode connection layers are arranged in a layered structure.

3. The battery module according to claim 2,
wherein the electrode connection layers are disposed between the insulation layers, respectively.

4. The battery module according to claim 3,
wherein the cover bus bar includes:
a first insulation layer configured to form a lower side of the cover bus bar and provided to face the plurality of battery cells;
a first electrode connection layer disposed at an upper side of the first insulation layer and electrically connected to one of positive electrodes or negative electrodes of the plurality of battery cells;
a second insulation layer disposed at an upper side of the first electrode connection layer;
a second electrode connection layer disposed at an upper side of the second insulation layer and electrically connected to the other of the positive electrodes or the negative electrodes of the plurality of battery cells; and
a third insulation layer disposed at an upper side of the second electrode connection layer to form an upper side of the cover bus bar.

5. The battery module according to claim 4,
wherein the first electrode connection layer and the second electrode connection layer are provided as a flexible printed circuit board.

6. The battery module according to claim 5,
wherein an insulation pattern is provided to a rim of at least one of the first electrode connection layer or the second electrode connection layer.

7. The battery module according to claim 6,
wherein a rim of the cover bus bar is bonded to a rim of the cell housing by seaming.

8. The battery module according to claim 1, further comprising:
a heatsink mounted to at least one of the cell housing or the cover bus bar to cool the plurality of battery cells.

9. The battery module according to claim 8,
wherein the phase change material is a material that, when a temperature of the plurality of battery cells is raised, evaporates and moves toward the cover bus bar, and then is liquefied by the heatsink and moves to a lower side of the cell housing.

10. The battery module according to claim 1,
wherein the plurality of battery cells are cylindrical secondary batteries.

11. A battery pack, comprising:
at least one battery module defined in claim 1; and
a pack case configured to package the at least one battery module.

12. A vehicle, comprising:
at least one battery pack defined in claim 11.

13. The battery module according to claim 1,
wherein the cover bus bar configured to seal the cell housing.

14. The battery module according to claim 1, further comprising:
a heatsink mounted to a side of the cell housing.

* * * * *